United States Patent [19]
Gottshall et al.

[11] Patent Number: 5,714,946
[45] Date of Patent: Feb. 3, 1998

[54] APPARATUS FOR COMMUNICATING WITH A MACHINE WHEN THE MACHINE IGNITION IS TURNED OFF

[75] Inventors: Paul C. Gottshall; Steven R. McCoy, both of Washington; Paul M. Young, Peoria, all of Ill.

[73] Assignee: Caterpillar Inc., Peoria, Ill.

[21] Appl. No.: 638,456

[22] Filed: Apr. 26, 1996

[51] Int. Cl.$^6$ ................................................ G08B 21/00
[52] U.S. Cl. ........................... 340/870.16; 340/825.06
[58] Field of Search ...................... 340/870.16, 825.06, 340/870.07, 870.3, 870.39, 825.09; 455/38.2, 38.3, 343, 345

[56] References Cited

U.S. PATENT DOCUMENTS 5,025,253  6/1991  DiLullo et al. ............... 340/825.06
5,073,943  12/1991  Chapman ........................... 381/86
5,142,278  8/1992  Moallemi et al. ............ 340/825.06

FOREIGN PATENT DOCUMENTS 0383593  8/1990  European Pat. Off. .

Primary Examiner—Jeffery Hofsass
Assistant Examiner—Andrew Hill
Attorney, Agent, or Firm—Mario J. Donato

[57] ABSTRACT

An apparatus for communicating with an electronic control module on an engine of a machine from a remote location is disclosed. The apparatus includes an electronic controller associated with a power supply on the electronic control module. A sensor is connected to the electronic controller for sensing an engine parameter indicative of the operating state of the engine. A communications interface for transmitting and receiving a communication signal is associated with the electronic controller. An ignition switch is connected to the power supply, such that when the ignition switch is in the off position, the electronic controller is powered down. The electronic controller is subsequently powered up if a communication signal is received from the remote location. This in turn allows a sensed engine parameter to be communicated to the remote location, and further allows machine information to be downloaded from the remote location to the electronic control module while the ignition switch remains in the off position.

6 Claims, 3 Drawing Sheets

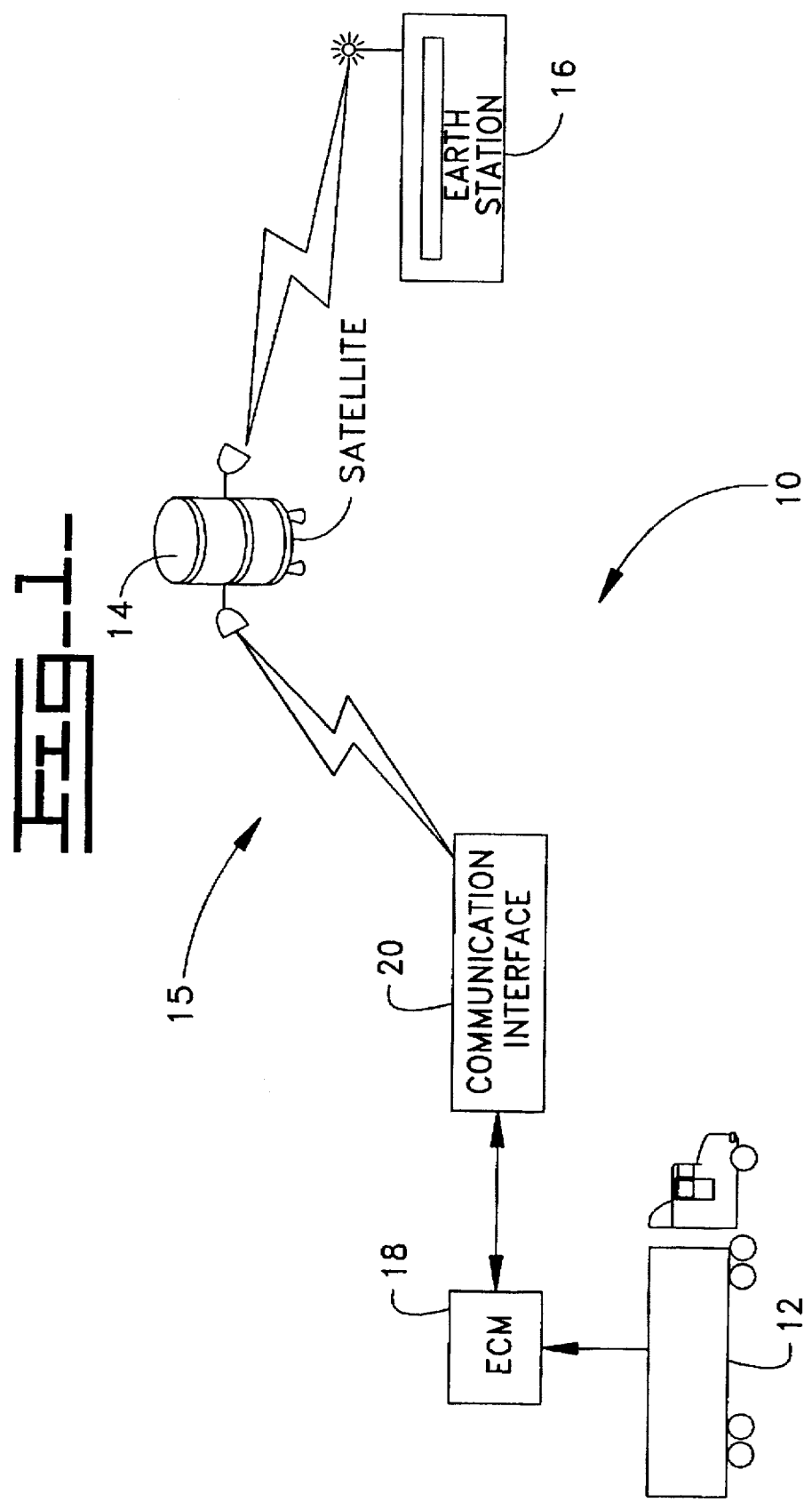

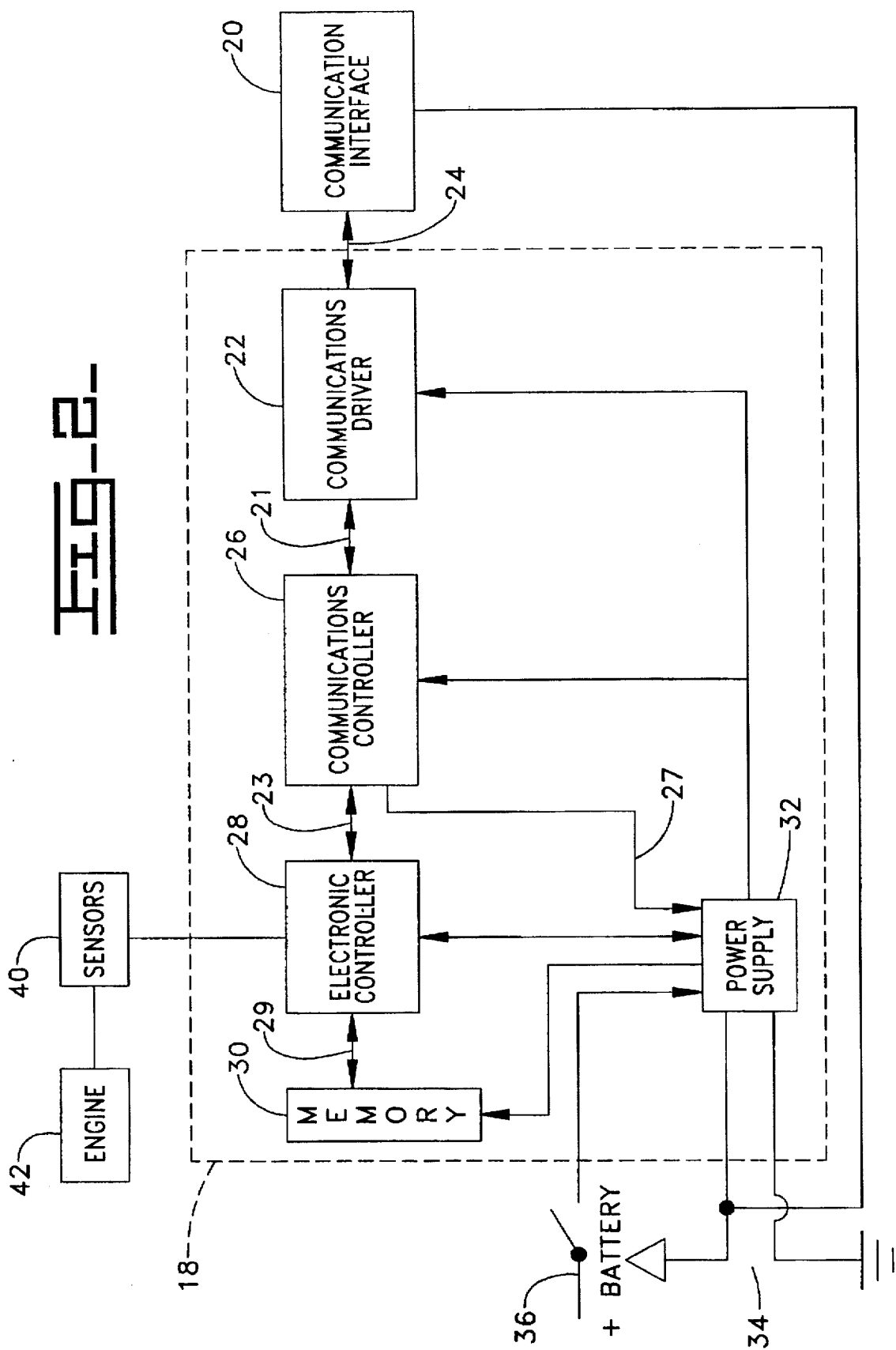

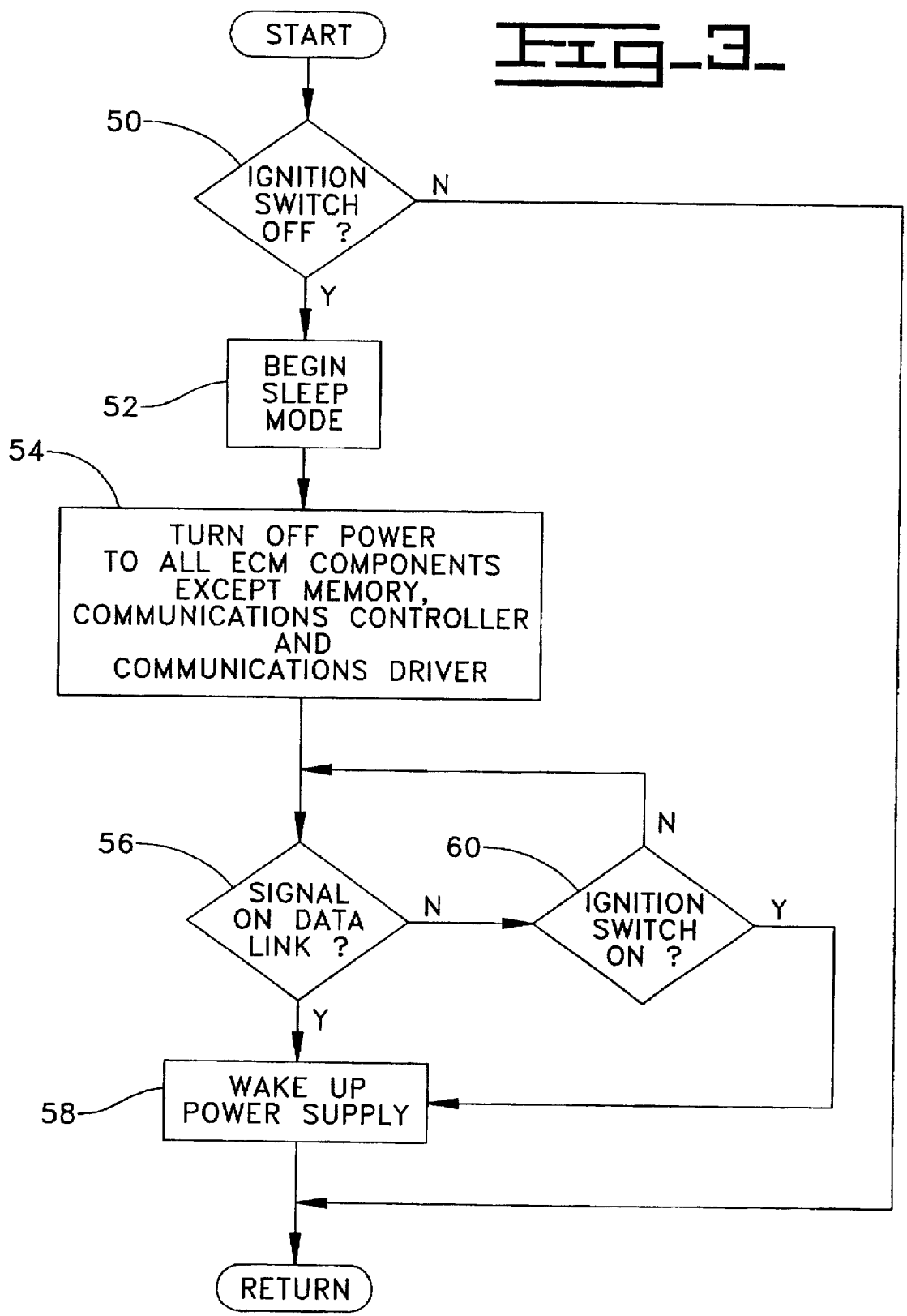

5,714,946

APPARATUS FOR COMMUNICATING WITH A MACHINE WHEN THE MACHINE IGNITION IS TURNED OFF

TECHNICAL FIELD

The present invention generally relates to communicating with a machine from a remote location, and more particularly, to an apparatus for communicating with a machine when the machine ignition is turned off.

BACKGROUND ART

Fleet management is a major concern in any environment in which it is desirable to monitor the status and location of a machine, such as a truck, a ship, etc. on a regular basis. The fleet manager must keep track of the status and location of each machine in the fleet. Thus, for each machine in the fleet, the fleet manager must know whether it is in service or out of service, as well as being able to monitor the progress of each machine in the fleet for scheduling purposes, maintenance purposes, etc. Only with this information can the fleet be efficiently managed.

Security is also a major concern to the fleet manager. Machine theft is commonplace and the fleet manager should be kept aware of unauthorized use of machines. Moreover, it is desirable that the fleet manager have the capability of tracking the travel of a machine in unauthorized use so that law enforcement authorities can be kept apprised accordingly.

The mechanical condition and various operating parameters of each machine in the fleet are also of importance to the fleet manager. The fleet manager should have regular access to operating parameters of the machine such as speed, engine temperature, oil pressure, brake line pressure and the like, as well as being immediately apprised of any abnormality in any of the operating parameters.

Typically, when an engine controller is powered down (e.g. the key is removed from the ignition of the machine), the fleet manager is incapable of monitoring the status of the machine. However, it may be desirable for the fleet manager to be able to monitor the status of the machine at all times, including when the engine control is powered down, as well as being able to download information to the machine at all times, including when the engine controller is powered down.

The present invention is directed to overcoming one or more of the problems set forth above.

SUMMARY OF THE INVENTION

The present invention is directed toward an apparatus for communicating with an electronic control module on an engine of a machine from a remote location. The invention includes an electronic controller associated with a power supply on the electronic control module. A sensor is connected to the electronic controller for sensing an engine parameter indicative of the operating state of the engine. A communications interface for transmitting and receiving a communication signal is associated with the electronic controller. An ignition switch is connected to the power supply, such that when the ignition switch is in the off position, the electronic controller is powered down. The electronic controller remains powered down until either (i) the machine ignition switch is placed in the on position; or (ii) a communication signal is received on the data link from the remote location. In that event, a wake up command signal is sent to the power supply, thereby supplying power to the electronic controller. This in turn allows a sensed engine parameter to be communicated to the remote location, and further allows machine information to be downloaded from the remote location to the electronic control module while the ignition switch remains in the off position.

These and other aspects and advantages of the present invention will become apparent upon reading the detailed description of the preferred embodiment in connection with the drawings and appended claims.

BRIEF DESCRIPTION OF THE DRAWINGS

For a better understanding of the present invention, reference may be made to the accompanying drawings, in which:

FIG. 1 is a diagrammatic representation of an embodiment of the present invention as utilized with a tractor trailer;

FIG. 2 is an overview of a preferred embodiment of the present invention in block diagram form; and FIG. 3 is a flow diagram illustrating the function of the wake up feature of the preferred embodiment of the present invention.

DESCRIPTION OF A PREFERRED EMBODIMENT OF THE INVENTION

Referring now to the drawings, a communications system 10 is shown generally in FIG. 1, wherein the present invention is adapted to relay information from a machine 12 in a fleet to a remote location 16, such as an earth station, via a communications network 15. In the preferred embodiment, communications network 15 is a satellite communications network. However, it will be appreciated by those skilled in the art that there are a number of ways in which information may be relayed from a machine to a remote location. Other possible means of communications include radio frequency transceivers for short range communications and communications between computers via modems.

The satellite communications network 15 includes at least one satellite 14. A communications interface 20 provides communication between the machine 12 and the communications network 15. In the preferred embodiment, communications interface 20 is a transceiver. The machine 12 includes an electronic control module (ECM) 18. Typically, ECM's are used to control a subsystem of the machine, for example, the machine's engine or transmission.

With reference to FIG. 2, a block diagram of a preferred embodiment of the communications system 10 is shown. The ECM 18 includes an electronic controller 28. Associated with the electronic controller 28 is a memory device 30. As is known in the art, the electronic controller 28 and the memory 30 are generally connected by an address bus and a data bus, among others, which are generally represented in FIG. 2 by connection 29. As is known to those skilled in the art, memory 30 generally includes both software instructions and data storage. Although FIG. 2 discloses a discrete memory device 30, separate from the electronic controller 28, other devices are known in the art which include an electronic controller 28 and memory 30 within a single device. The present invention is not limited to the use of an electronic controller 28 and discrete memory device 30, but instead includes all other electronic controller 28 and memory 30 combinations as may fall within the spirit and scope of the present invention as defined by the appended claims.

The electronic controller 28 used in a preferred embodiment of the present invention is a Motorola 68300 family microprocessor, manufactured by Motorola Semiconductor Products, Inc. located in Phoenix, Ariz. However, other suitable microprocessors known in the art can be readily and easily substituted without deviating from the spirit and scope of the present invention.

In a preferred embodiment, the electronic controller 28 is connected to a communications controller 26. In the real time environment of a machine engine, a separate communications controller is provided. However, it will be recognized by those skilled in the art that under certain circumstances, the electronic controller 28 may be capable of performing the functions of the communications controller 26. The communications controller 26 produces a command signal 27 which is received by the power supply 32, which in turn powers up the electronic controller 28, as will be described in greater detail below. A communications driver 22 is connected between communications controller 26 and communications interface 20. Communications driver 22 sends and receives messages to/from communications controller 26 via bus 21. In addition, communications driver 22 sends and receives messages to/from communication interface 20 via bus 24. It will be appreciated by those skilled in the art that communications driver 22 may be any intermediate circuitry capable of receiving a communications signal and massaging that signal to place it in a form that the electronic controller 28 can receive.

Normally, during engine operating conditions (e.g. machine ignition switch 36 in the "on" position), power supply 32 supplies the necessary voltage requirements to all the modules residing on the ECM 18. Thus, system power is derived from the machine battery 34, and power supply 32 provides the necessary power conversion, conditioning, and regulation for distribution to the various modules. A control line 35 is shown connecting the power supply 32 to the electronic controller 28. The control line thus permits microprocessor control of the power supply shut-down to all modules. The electronic controller 28 thus senses ignition turnoff as a high priority interrupt and the normal activity of the electronic controller 28 is suspended in favor of a shut-down routine. After all data being processed is properly stored, the shut-down routine effectively implements the power supply shut-down which in turn shuts down power to the electronic controller 28. It should be noted that in the preferred embodiment, memory 30, communications controller 26, and communications driver 22 are CMOS components. As such, even when the engine is powered down, a trickle current flows from power supply 32 to each of these modules.

As described above, when an engine controller is powered down (e.g. the key is removed from the ignition of the machine), the fleet manager is typically incapable of monitoring the status of the machine. However, it may be desirable for the fleet manager to be able to monitor the status of the machine at all times, including when the engine controller is powered down, as well as being able to download information to the machine at all times, including when the engine controller is powered down. Referring now to FIGS. 2 and 3, an overview of an embodiment of the present invention in block diagram form is shown in FIG. 2, and a flow diagram illustrating the function of the wake up feature of the present invention is shown in FIG. 3. As seen in FIGS. 2 and 3, a determination is made whether or not the machine ignition switch is off at decision block 50. If the ignition switch is off, the shut-down or "sleep" mode is begun at control block 52, wherein power to all ECM modules except memory 30, communications controller 26, and communications driver 22 is turned off at control block 54. Therefore, at this point, the engine controller 28 is powered down.

The engine controller 28 remains powered down until either (i) the machine ignition switch 36 is placed in the on position (decision block 60); or (ii) a communication signal is received on the data link 24 from the remote location (decision block 56). In the event either (i) or (ii) above occurs, a wake up command signal 27 is sent to power supply 32 (control block 58), thereby supplying power to electronic controller 28. This in turn allows a sensed engine parameter to be communicated to the remote location 16, and further allows machine information to be downloaded from the remote location 16 to the electronic control module 18 while the ignition switch 36 remains in the off position. Thereafter, the electronic controller 28 may be powered down from a command received from the remote location, or may automatically power down after a predetermined period of time if the ignition switch 36 is not turned on, thereby providing an anti-theft feature.

INDUSTRIAL APPLICABILITY

Fleet management is a major concern in any environment in which it is desirable to monitor the status and location of a machine on a regular basis. The fleet manager must keep track of the status and location of each machine in the fleet. Thus, for each machine in the fleet, the fleet manager must know whether it is in service or out of service, as well as being able to monitor the progress of each machine in the fleet for scheduling purposes, maintenance purposes, etc. Only with this information can the fleet be efficiently managed.

Security is also a major concern to the fleet manager. Machine theft is commonplace and the fleet manager should be kept aware of unauthorized use of machines. The mechanical condition and various operating parameters of each machine in the fleet are also of importance to the fleet manager. The fleet manager should have regular access to operating parameters of the machine such as speed, engine temperature, oil pressure, and the like, as well as being immediately apprised of any abnormality in any of the operating parameters.

Typically, when an engine controller is powered down (e.g. the key is removed from the ignition of the machine), the fleet manager is incapable of monitoring the status of the machine. However, it may be desirable for the fleet manager to be able to monitor the status of the machine at all times, including when the engine control is powered down, as well as being able to download information to the machine at all times, including when the engine controller is powered down. The present invention provides an apparatus for communicating with a machine from a remote location, and more particularly, an apparatus for communicating with a machine when the machine ignition is turned off.

Thus, while the present invention has been particularly shown and described with reference to the preferred embodiment above, it will be understood by those skilled in the art that various additional embodiments may be contemplated without departing from the spirit and scope of the present invention.

We claim:

1. An apparatus for communicating with an electronic control module on an engine of a machine from a remote location, comprising:

an electronic controller, said electronic controller receiving and generating machine information, said electronic controller associated with a power supply on said electronic control module;

a memory device associated with said electronic controller;

a sensor connected to said electronic controller for sensing an engine parameter indicative of the operating state of said engine;

a communications interface for transmitting and receiving a communication signal, said communications interface associated with said electronic controller; and an ignition switch associated with the power supply on said electronic control module, said ignition switch being moveable between an on position and an off position, such that when said ignition switch is in the off position, said electronic control module is powered down;

said electronic control module being subsequently powered up upon receipt of the communication signal from said remote location, thereby allowing the sensed engine parameter to be communicated to the remote location, and further allowing machine information to be communicated between the remote location and the electronic control module while the ignition switch remains in the off position.

2. An apparatus as recited in claim 1, including a communications network connected between said communications interface and said remote location, said communications network adopted to relay information between the machine and the remote location.

3. An apparatus as recited in claim 2, wherein said communications network is a satellite communications network.

4. An apparatus as recited in claim 1, wherein said communications interface is a transceiver.

5. An apparatus as recited in claim 1, including a communications controller, said communications controller being connected to said electronic controller and said power supply, said communications controller adapted to produce a command signal in response to the communication signal being received from the remote location, said command signal being received by the power supply, which in turn supplies power to the electronic controller.

6. An apparatus as recited in claim 5, including a communications driver, said communications driver connected between said communications controller and said communications interface, said communications driver sending/receiving messages to/from said communications controller and said communications interface.

* * * * *